United States Patent [19]

Böhm et al.

[11] 4,366,719
[45] Jan. 4, 1983

[54] INSTRUMENT FOR MEASURING THE FLOW RATE OF A FLUID IN MOTION

[75] Inventors: Nándor Böhm; János Böhm; Róbert Böhm, all of Budapest, Hungary

[73] Assignee: Közuti Közlekedési Tudományos Kutató Intézet, Budapest, Hungary

[21] Appl. No.: 217,784

[22] Filed: Dec. 18, 1980

[51] Int. Cl.³ .............................................. G01F 1/28
[52] U.S. Cl. ................................. 73/861.76; 73/203
[58] Field of Search ........... 73/861.52, 861.61, 861.76, 73/203

[56] References Cited

U.S. PATENT DOCUMENTS

| 1,160,418 | 11/1915 | Kocoureit | 73/861.76 |
| 2,892,348 | 6/1959 | Ekstrom, Jr. | 73/861.76 |
| 3,463,003 | 8/1969 | Pierman et al. | 73/861.76 |
| 4,065,966 | 1/1978 | Meeks, Jr. | 73/861.76 |

Primary Examiner—Herbert Goldstein
Attorney, Agent, or Firm—Karl F. Ross

[57] ABSTRACT

A flow-rate meter has a cylindrical housing in which a counterweighted blade is pivotable on a shaft about the axis of the housing which is subdivided by a radial partition, an inlet port and an outlet port opening axially into this housing on opposite sides of the blade. The blade is magnetically coupled with a logarithmic scale and is provided with a logarithmic spring against which the force of the water flowing past the blade works.

6 Claims, 3 Drawing Figures

INSTRUMENT FOR MEASURING THE FLOW RATE OF A FLUID IN MOTION

FIELD OF THE INVENTION

The invention relates to an instrument for measuring the flow rate of a fluid, usually a liquid, in motion, which indicates the varying quantity of the liquid flowing through a slots of the rotating blade based on the differential pressure acting on the blade as a result of the flow. The scale of the instrument is adjustable according to the liquids of different specific gravity, or according to the specific gravity variation, the flow cross section is externally adjustable and automatically variable by sensing the viscosity variation with the temperature. The instrument is also suitable for measuring the flow of gases and dry steam.

BACKGROUND OF THE INVENTION

Measuring the instantaneous flow rate of liquids during rapid variations and during unit Δt of time is frequently required.

The known and customary flow meters can be divided into two groups: those counting units of flow (i.e. the flow) rate of the liquid and those measuring the flow speed.

The devices counting the flow rate may be e.g. piston meters, rotary wheel, or chamber-type wet or dry meters, etc.

The fuel gauges, the so-called consumption meters used in motor vehicles are actually also flow rate counters, because the quantity of the consumed fuels is measured during a certain time or distance interval. The averaging does not yield an adequate picture, because during the time of measuring—due to the road conditions, speed variations of the vehicle (acceleration, deceleration), in other words due to the load fluctuation of the motor—these instruments give results with highly varying error percentage for the measured interval of time or distance.

In the other group, i.e. the flow velocity meters the quantity can be measured based upon knowledge of the given cross section with the formula based on the flow speed: $Q = Fc$. However, the speed is influenced by several factors, such as pressure, specific gravity, heat, absolute temperature, contraction, viscosity. The speed variation—m/sec—mainly due to the differential pressure and specific weight variation of square root relationship—can be indicated with very complicated instruments and calculated with sliderules.

Speedometers functioning with throttling or ram pressure measurement are familiar, but these give the data only for the specific test, and neither these, nor the Prandtl-type tube—which functions by converting the speed to pressure—measure the flow rate, or display the result of the measurement.

The instrument according to the invention measures a varying flow rate of liquid and may be used for the setting and accurate measurement of the consumer demand of the various media in motion, water-, gasmeters, as well as for checking steam utilization of devices functioning with dry steam, for measuring the fuel consumption of internal combustion engines and vehicles, for measuring the liquids flowing in pipelines, and the friction resistance, pressure loss, etc. of pipelines. Through the shunt tripping, the instrument is applicable for measuring the varying quantity of liquid media flowing through in any quantity.

The instrument functions with throttling, in such a way that the differential pressure and variation of the liquid carried through the instrument for utilization is indicated in the quantity of the liquid. The adjustment of the instrument in connection with the specific weight variation of the liquid can be performed from the outside. The contraction, and discharge cross section in accordance with the liquid types are adjustable on the instrument similarly from the outside. The flow rate of liquid is indicated by the instrument on a logarithmic scale, which—when connected with further varying phenomenon—is suitable for the formation of new measuring units, such as Q/km, G/km, etc. The obtained values may instantaneously vary according to the time Δ.

BRIEF DESCRIPTION OF THE DRAWING

The subject of the invention is described in detail by way of example with reference to the enclosed drawing, in which.

SPECIFIC DESCRIPTION

Figure 1:
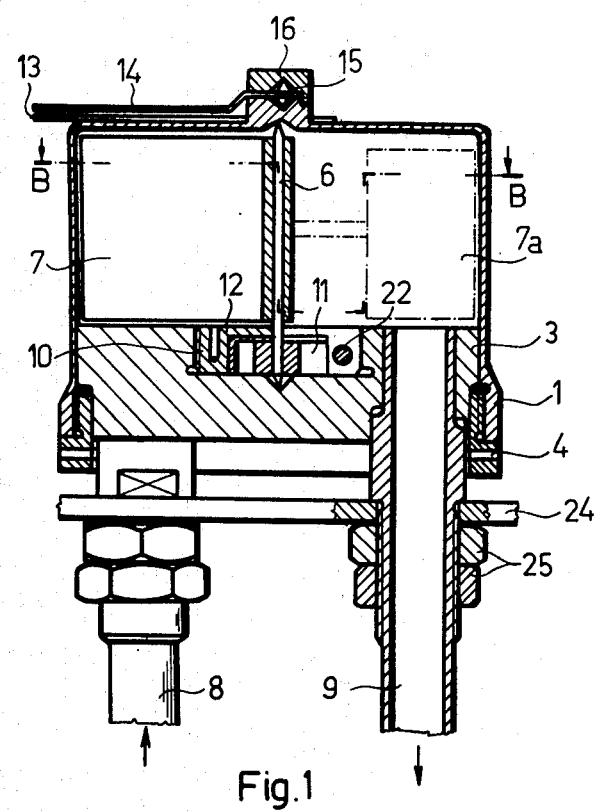
FIG. 1 is a vertical section along the line A—A of FIG. 2 of a device according to the invention.
Figure 2:
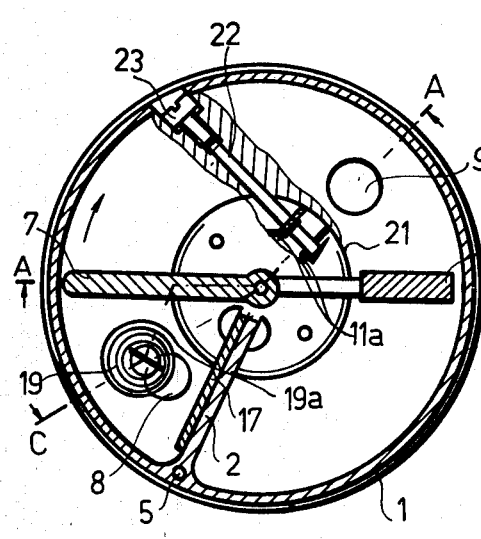
FIG. 2 is a cross section along line B—B of FIG. 1.
Figure 3:
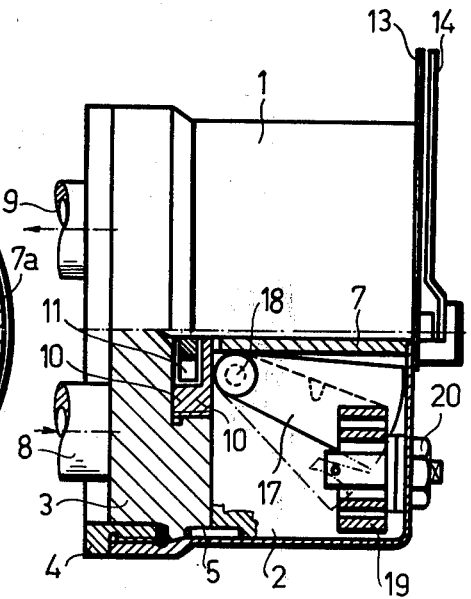
FIG. 3 is a side view half showing the device of FIG. 2, and partially in section along line C—C of FIG. 2.

Most of the functioning elements of the instrument are included in a pot-shaped housing 1 having a wall 2 which extends radially toward the center and which is closed by bottom plate 3 fixed in the housing with the threaded screw 4 and dowel pin 5 with the insertion of packing. A shaft 6 has its tips notably embedded in housing 1 and bottom plate 3. The blade 7 with its counter-balance arm 7a is tightly fitted on the shaft 6.

The liquid to be measured flows into the instrument housing through the axial inlet 8 and passes out through the outlet pipe 9. The liquid inlet and outlet pipes are fixed into the bottom plate 3 with threads and with the use of packing rings. A coil spring 11 in spring casing 10 is arranged in a space recessed in the bottom plate and protected by packing against the pentration of liquid. The hub 12 forming the spring core, is fixed on shaft 6.

Blade 7 is made of adequately dimensioned, strong permanent magnet material, or such a material is laminated or mounted on it.

The logarithmically graduated scale 13 is arranged on the top of house 1 with dial 14 made of mild steel above the scale. The dial is fixed on axle pin 15, which its pointed tips is rotatably embedded with the scale dial 14 in the bearing housing between the cylindrical extension of the house and cap 16 mounted on it. The dial 14 is turned by the magnetic force of blade 7 covered with permanent magnet.

Narrow slots—the cross section of which can be determined on the basis of the flow coefficient with calculation or calibration—are formed along the three-side edges of blade 7 in co-rotation with shaft 6, the edges being adjacent to the upper wall, shell and bottom 3 of the house 1. Furthermore slots are formed between the hub of the shaft and the radial wall 2, for the purpose of passing on the liquid flowing through the inlet pipe 8.

Due to the variability of viscosity and specific gravity of the various liquids a control plate 17 is used in the space between wall 2 and blade 7, which admits the liquid arriving through the inlet pipe 8, said control plate being rotatably on wall 2 around pin 18, whereby the flow cross section of the liquid is variable and controllable.

Adjustment of the control plate 17—dependent on the temperature—is performed suitably by the bimetal sensing spring 19 of thermoelastic coefficient—dependent on the temperature. This spring is fastened in sealed condition to the upper plate of house 1 with screws 20. The heat sensing spring 19 is connected to the control plate 17 by its end 19a. Since the spring 19 senses the varying viscosity of the liquid—arriving through the inlet pipe 8—automatically with the temperature variation, it alters the flow rate of the liquid as well, through actuation of the control plate 17.

The coil spring 11 in the spring casing 10 is surrounded by ring 11a, and with the aid of screw 21 used in the extensions of said ring, the distance between the extensions of the ring and thereby the diameter of ring 11a surrounding the coil spring may be varied. By reducing or increasing the diameter, the number of the external turns of the spring band, its tensioning, moment and characteristic curve can be varied. The screw 21 can be turned from the outside with a screwdriver inserted through hole 22, and then the hole is closed with screw 23.

The instrument can be mounted on a plate 24, or supporting structure available on its place of application, including the liquid inlet and outlet pipes 8 and 9 and with the use of screw nuts 25.

Operation of the instrument: the liquid to be measured flows in through the inlet pipe 8, and it passes through the slots along blade 7 into the space of the outlet pipe 9, then to its place of application, or to the consumer. In the meantime the pressure of the liquid arriving through the inlet pipe 8 acts on blade 7, while the pressure drops on the other side of the blade, since the liquid flowing through the slots around blade 7 passes off through the outlet pipe 9. The flow is independent from the absolute pressure and it is the result only of the differential pressure before and after the blade. This differential pressure acts on blade 7, which is kept in balance against turning by the coil spring 11.

The coil spring is in itself a novel, logarithmic coil spring, which with its external and internal initial turns is wound onto the inner mantle surface or ring 11a, and onto the outer mantle surface of spring core 12. In another embodiment of the coil spring, its cross section diminishes or increases along the length of the band, starting from the outer and/or inner turn, which is attained by dimensioning suitably in such a way, that the cross section is varied—while keeping its thickness at a constant value—by the continuous reduction or increase of the width of the band. This way the work of the spring, i.e. its resilient, restoring work, the so-called counter-moment acting on blade 7, as well as the demonstrating spring diagram, the so-called spring characteristic curve can be formed according to the logarithmic curve deviating from the straight line.

Characteristic of the coil spring is formed according to the logarithmic characteristic curve as illustrated by the example, in such a way, that by turning the screw 21 the diameter of ring 11a—that includes the coil spring—is varied, then by varying the number of turns of the spring band starting from the outer turns, its tensioning and working length are also varied.

The logarithmic coil spring 11 renders the use of the square root scale unnecessary, since the square root has an identical, but ½ scale on the logarithmic scale. Similarly the logarithmic scale enables that by adjustment of a scale corresponding to various values of specific weight, or flow coefficient, the scale 13 should indicate the respective measuring values. Multiplying with square root of the specific weight, the weight of the liquid, and by dividing with the same, its cubic capacity are obtained, the values of which can be taken from the logarithmic scale. By actuation of the control plate 17 adjustably arranged on wall 2, the heat-sensing spring 19 varies the flow cross section of the liquid in such a way, that the flow rate is varied according to the viscosity varying automatically with the temperature variation.

If the viscosity of the liquid does not vary within the measuring limit, then the control plate 17 and the actuating heat-sensing spring 19 can be disconnected by its end 19a, since even in case of deviations—due to production and assembly—the correct measuring value can be adjusted by calibration, by measuring, a certain quantity of liquid and—due to the property of the logarithmic coil spring—by turning the scale division 13. If the measured liquid quantity would not give accurate value at other marks of value, then by turn of screw 21 the logarithmic coil spring is adjusted and the instrument is set for the accurate measurement of the varying quantity of liquid.

The flow rate of gases and dry steam is also measurable with the logarithmic scale, when the temperature and pressure are similarly calibrable according to the formula of the multipliers, which otherwise can be calculated from diagram, or manually on the slide rule.

In addition to the solution described as an example, the turn of the dial may be of 360° with the use of geared transmission, furthermore the angle of rotation, or the operative distance of blade 7 can be increased to about 120°–130°, even without a geared transmission. The instrument including its logarithmic coil spring may be built together or combined with other instruments, furthermore it can be constructed also for the measurements showing other measuring units.

What we claim is:

1. A rate-of-flow meter for a fluid, comprising:
    a substantially cylindrical housing formed with a generally radial wall;
    a blade pivotable about the axis of said housing within the housing and defining with a top, bottom and cylindrical wall thereof, gaps through which said fluid can flow;
    an inlet for said fluid opening into one axial end of said housing, and an outlet for said fluid opening into said one axial end of said housing on opposite sides of said blade;
    a logarithmic scale on the opposite axial end of said body and a dial cooperating with said scale;
    means coupling said dial with said blade whereby said dial and said scale indicate the flow rate of said fluid; and
    a logarithmic coil spring in said housing connected to said blade for yieldably biasing same against the force of said fluid flowing from said inlet to said outlet past said blade.

2. The rate-of-flow meter defined in claim 1 wherein said means coupling said dial with said blade include permanent magnetic material on said blade, said dial being formed from magnetically attractable material.

3. The rate-of-flow meter defined in claim 2 wherein said coil spring is received in a ring, further comprising means for varying the size of said ring and thereby the number of turns and the tension of said spring.

4. The rate-of-flow meter defined in claim 3 wherein the means for varying said size of said ring includes a screw.

5. The rate-of-flow meter defined in claim 2 wherein said wall is provided with a swingable plate for controlling the flow cross section between said inlet and said outlet.

6. The rate-of-flow meter defined in claim 5, further comprising a heat-sensing spring disposed in line with said inlet and connected to said plate for controlling said flow cross section.

* * * * *